Nov. 10, 1964 F. P. CIRONE 3,156,778

SUPERVISORY CIRCUITS FOR TELEPHONE SUBSCRIBER'S LINE

Filed Dec. 24, 1959

INVENTOR
F. P. CIRONE
BY S.E. Hollander
ATTORNEY 3,156,778
Patented Nov. 10, 1964

3,156,778

SUPERVISORY CIRCUITS FOR TELEPHONE SUBSCRIBER'S LINE

Frank P. Cirone, Dover, N.J., assignor to Bell Telephone Laboratories, Incorporated, New York, N.Y., a corporation of New York Filed Dec. 24, 1959, Ser. No. 861,909
11 Claims. (Cl. 179—18)

This invention pertains to supervisory circuits and more specifically to supervisory circuits utilized to determine the condition of subscriber subset loops in a telephone switching system.

It has been found advantageous in telephone switching systems to utilize line concentrator systems to reduce the number of trunks connecting the subscribers to a central office. Such concentrator systems include equipment positioned remote from the central office for connecting a given number of subscriber subset loops to a lesser number of trunks to a central office thereby appreciably reducing the cost of outside plant materials. In such a system the subscribers are not directly connected to a central office, and switching equipment must be provided to make the required connections. The switching equipment which makes the actual connection between a subscriber and the trunk to the central office resides in the remote concentrator and is shared by all of the subscriber subset loops connected to the concentrator to further reduce duplication and expense.

The switching requirements of a remote line concentrator are determined by the type of service of which a subscriber is desirous, i.e., a service request and an answer require that a subscriber be connected to the central office while a hang-up requires that the subscriber loop be disconnected to allow use of the trunk by other subscribers. The switching required by the subscriber service needs is controlled by equipment which, upon receipt of signals descriptive of those needs, determines what connections are required therefor and influences the physical switching circuitry to make those connections. This equipment, which normally resides in the central office, will be described hereinafter as switching control circuitry. This invention deals with the circuitry necessary to apprise the switching control circuitry of the service needs of the subscriber, i.e., the subscriber subset monitoring or supervisory equipment.

In most telephone systems, subscriber subset loops display unique direct-current conditions for the "on-hook" and "off-hook" states. The direct-current condition of the subscriber loop thus is indicative of the on-hook or off-hook state of the subset, and knowledge of this condition may be utilized by the switching control circuitry to determine the switching requirements of the subsets of a remote concentrator. It is therefore desirable to have circuits capable of determining the direct-current condition of a subscriber subset loop. Physically, since there may be no direct metallic connections between the subset and the central office in a remote line concentrator, this supervisory equipment for apprising the switching control circuitry in the central office of subscribers' service needs is connected to the subset loops and resides within the remote concentrator equipment.

Supervisory circuits for determining the direct-current condition of subscriber loops should be capable of discrimination between relatively close but dissimilar conditions and of presenting unique output signals clearly indicative of these conditions. Certain prior art supervisory circuits have been unable to provide clearly unique and easily discriminated output signals. For example, diodes utilized as gates in certain prior art circuits have been incapable, under certain conditions, of providing a "no-signal" output due to the inherent capacitance of the diodes which allows interrogating signals to leak through. The same problem arises in certain transistor gating circuits due to the inability of the circuitry to back-bias the transistor gate and provide complete turn-off thereof. The circuits of my invention are capable of a very high degree of discrimination and present clearly unique output signals without leakage problems.

In a subscriber subset loop, certain external influences tend to produce currents which may affect the measurement of the direct-current condition of the subset loop. For instance, fluctuating current in lines running parallel and adjacent to the wires of the subset loop creates magnetic fields which may induce currents in the subset loop and affect the measurement of the condition thereof.

Specifically, a subset loop may comprise a subscriber subset connected to a transformer by two wires which are physically adjacent and parallel. It is advantageous to maintain the wires of a subset loop in the parallel position since magnetic fields caused by currents in other adjacent conductors then induce equal but opposed currents in each wire of the subset. These induced currents, known as longitudinal currents, advantageously cancel each other and have no affect on the subset itself, which is substantially isolated from ground. However, the longitudinal currents do affect the condiiton of the circuit in varying degrees for measurements of specific points around the loop with respect to a reference potential. Thus, the changes occasioned by longitudinal currents may affect the determination of the direct-current condition in an obviously undesirable manner. The circuits provided for supervising the condition of a subset loop should therefore be such that longitudinal currents have no affect on the results of the determination.

A supervisory circuit used to determine the direct-current condition of a subscriber subset loop should be impervious, not only to longitudinal disturbances in the loop, but also to the normal alternating-current signals of the loop, including ringing and voice currents. Moreover, not only should the supervisory circuit be impervious to loop signals, but it should create no signals of an audible frequency capable of affecting the loop adversely by interference with voice or ringing signals.

In determining the direct-current condition of a subscriber subset loop, the supervisory circuitry may be directly connected to the loop. The switching control circuitry, which directs the switching of all of a group of subsets, may include input circuitry which periodically scans the output of each of the supervisory circuits and relays the results of the scanning to the controlling portions of the switching control circuitry. If this "scanning circuitry" operates at an audible frequency to examine the output of the supervisory equipment of each subset, the variation in impedance at the output of the equipment due to the examination thereof may furnish an audible signal capable of affecting the subscriber loop. In addition, in supervisory circuits utilizing interrogating equipment, if the interrogating signals are in the audble frequency range, a like result may obtain. It is obvious that any audible noise is undesirable in the subscriber loop since it affects the message received by the customer. It is therefore desirable that the supervisory equipment be arranged to eliminate the effect of audible noise so that interrogating signals of any frequency and scanning circuitry operating at any frequency may be utilized.

In any supervisory circuit it is obviously desirable that the interrogating signals utilized have no effect on the measurement of the condition of the subset loop for such a result limits the accuracy of the measurement. A supervisory circuit should thus be of a type wherein the measurement of the condition of the loop is independent of the interrogating signals so that various interrogating signals may be used interchangeably.

In any telephone switching system utilized to serve a large number of customers, the cost of the various circuits included therein, is of prime importance. Therefore, the number and cost of elements in any supervisory circuit adapted for use in a telephone system must be held to a minimum. Additionally, the power requirements of any supervisory circuit should be held to a minimum to reduce the operating costs of such a switching system. This last is especially important in remote concentrator systems wherein many problems are encountered in furnishing power at the remote concentrator.

In view of the foregoing, it is a general object of this invention to improve the qualities of circuits used to supervise subscriber subset loops.

Another object of this invention is to provide a circuit capable of determining the direct-current condition of a subscriber subset loop.

It is another object of this invention to improve the ability of supervisory circuits to produce unique and easily discriminable outputs indicative of subset loop conditions.

A further object of this invention is to eliminate the effect of voice and ringing currents in the subset loop on the measurement of the direct-current condition of the subset loop.

An additional object of this invention is to determine the condition of a subscriber loop by means having no audible effect on the loop.

A more specific object of my invention is to provide a supervisory circuit utilizing interrogation signals of a large frequency range.

Another object of this invention is to eliminate the effect of longitudinal currents in the loop on the measurement of the condition thereof.

It is a further object of this invention to reduce the amount of power required for supervision of subscriber subset loops.

Briefly, the foregoing objects are accomplished in accordance with aspects of this invention by a nonlinear bridge circuit which is connected across the battery-feed resistors of a subset loop in a balanced manner to measure the direct-current condition thereof for controlling a transistor gate. The transistor has its control terminals connected across the normal null detection points of the bridge and is controlled by the voltages therebetween to gate an interrogating signal applied at an input terminal.

The use of a linear bridge circuit as a device for obtaining very close discrimination is well known. For a voltage applied across the diagonally opposed energizing points thereof, a balanced bridge produces equal voltages with respect to a reference at the two diagonally opposed null points so that no current flows in a detection or sensing device connected therebetween. Any change from the balanced condition, even though the change may appear minute, is detected by the detection device since the change of any arm from its balanced value renders the voltages at the null points different with respect to a reference. It is desirable that the discriminating ability of the bridge circuit be utilized in a supervisory circuit for signalling the change in the externally applied voltage.

A balanced linear bridge, however, remains balanced no matter what voltage is applied to the external energizing points while an unbalanced linear bridge is always unbalanced in the same polarity direction for any applied external voltage, so neither type of bridge is conveniently capable of producing unique signals descriptive of small external voltage changes.

I have discovered, however, that it is possible to utilize the bridge as a precision signalling circuit as desired if it can be rendered nonlinear so that it is balanced for but a single externally applied voltage. In such a case, variance of the external voltage below the balancing voltage produces a voltage difference in one direction between the null points while variance above the balancing voltage produces a voltage difference in the other direction. These two unique differences may control a detection device to produce unique signal outputs; and, by skillful choice of the elements thereof, the bridge may be made to discriminate between very close external voltages of the same polarity with respect to a reference potential.

Such a nonlinear bridge is obtainable if the voltage drop across one or more of the arms is controlled to remain a constant.

In these novel circuits, by the use of a constant voltage element in one arm of the bridge, a Zener diode for instance, the voltage between one null point and the external terminals varies linearly with the externally applied loop voltages while the voltage between the other null point and one of the external terminals remains constant. Thus the voltage across the null points of the bridge varies with a change in voltage in the loop in contradistinction to prior art balanced linear bridges wherein the voltage across the external energizing points of the bridge might vary without any effect on the voltage across the null points of the bridge. In this invention a transistor has its base and emitter connected to the null points so that when the externally measured voltage varies between values on both sides of the balanced point the voltage across the null points is alternately appropriate to both saturate and to completely back-bias the transistor to provide two unique output signals. The bridge circuits of this invention thus effectively discriminate between subset loop conditions and provide unique output signals indicative thereof.

Various embodiments of the invention provide logical output inversion, shunting of undesirable signals from the output terminal of the supervisory circuit to improve the discrimination ratio between the two unique signals, and dual nonlinear means for more closely controlling the single balancing point of the bridge.

A feature of this invention relates to the use of a bridge circuit for supervision of subscriber subset loops. The bridge circuit provides precise measurement of the condition of the subset loop.

Another feature of this invention relates to the use of one or more Zener diodes in the arms of a bridge circuit to render that circuit capable of gating control operations in a supervisory circuit. Such Zener diodes allow back-biasing of a transistor gate controlled by such a bridge to establish an "off" state for that transistor to eliminate leakage.

An additional feature of this nivention in one embodiment thereof relates to the use of a Zener diode in a bridge circuit to shunt undesirable leakage signals from an output terminal.

It is another feature of this invention in another embodiment thereof to utilize two Zener diodes to provide especially precise control of a gating transistor used in a supervisory network.

A further feature of this invention relates to the circuit arrangement providing balancing against longitudinal disturbances, providing for low power consumption, and rendering both supervisory and line circuits impervious to normally interfering currents in their allied circuits.

These and other objects and features of this invention will be better understood upon consideration of the following detailed description and the accompanying drawing in which.

Figure 1:
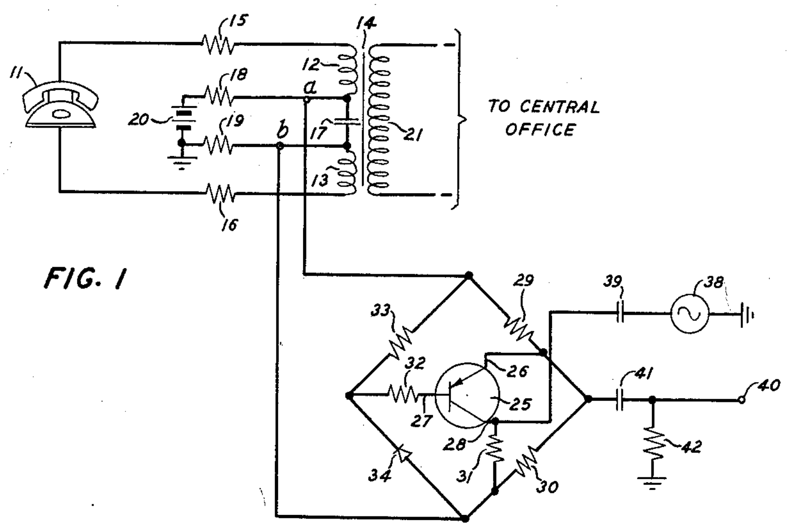
FIG. 1 is a schematic representation of a first illustrative embodiment of my invention for determining the direct-current condition of a subscriber subset loop.

Referring now to FIG. 1 there is shown a subscriber subset loop comprising a subset 11 connected to identical primary windings 12 and 13 of a transformer 14 by two equal-valued resistors 15 and 16. The transformer 14 has a secondary winding 21 which is connected to a remote concentrator, not shown, for completing a path to a central office, also not shown. Connected between the windings 12 and 13 is a shunting capacitor 17 advantageously such as to present negligible impedance to audio frequency currents. Connected across the capacitor 17 by two equal-valued resistors 18 and 19 for energizing the subset 11 is a battery 20.

The subset 11 may be of a well-known type which provides a very high impedance when on-hook and a low impedance when off-hook thereby furnishing a path for current in the off-hook condition and substantially no path for current in the on-hook condition. In the latter condition with no current flow in the loop, the voltage across the capacitor 17, excluding leakage, is that furnished by the batery 20. For reference hereinafter, the opposite terminals of the capacitor 17 will be known as points *a* and *b*. Since the resistors 15 and 16, the resistors 18 and 19, and the windings 12 and 13 advantageously comprise substantially equal pairs, in the off-hook state when current flows through the subset 11, equal voltage drops occur on each side of the subset loop.

Physically, the line which includes the resistor 15 lies parallel to that including the resistor 16, and any longitudinal currents induced in those lines oppose each other in the loop and thus cancel out with respect to the ungrounded subset 11. Further, since the battery 20 has substantially no resistance to such currents and the resistors 18 and 19 are substantially equal, the voltage due to longitudinal currents are the same across both of the resistors 18 and 19 so that the voltage between the points *a* and *b* does not vary in the presence of longitudinal currents. From the foregoing it is apparent that the direct-current potential between the points *a* and *b* has substantially a first constant value for the on-hook state of the subset and a second constant value for the off-hook state thereof.

Connected to the aforementioned points *a* and *b* is a supervisory circuit for measuring the direct-current condition of the subset loop. This circuit includes a PNP transistor 25 used as a sensing and gating device and having an emitter terminal 26, a base terminal 27, and a collector terminal 28. The emitter terminal 26 is connected to the point *a* by a resistor 29 and to the point *b* by a resistor 30. The resistors 29 and 30 advantageously form a linear voltage divider network representing two arms of a bridge circuit for regulating the voltage at the emitter terminal 26 linearly with respect to the voltage appearing across the capacitor 17. The collector terminal 28 is connected to the point *b* by a resistor 31. The base terminal 27 is connected by a resistor 32 to a second voltage divider network, representing the other two arms of the bridge circuit, comprising a resistor 33 connected to the point *a*, and a Zener diode 34 connected to the point *b*.

As may be noted from the drawing, the resistors 29, 30, 33, and the Zener diode 34 are arranged in the form of a bridge circuit. The external points of this bridge are directly connected to the points *a* and *b* of the subset loop to measure the voltage thereacross. Since the Zener diode 34 displays a constant voltage drop in the operating state, the null point between the diode 34 and the resistor 33 is maintained at a substantially constant voltage above the point *b*. If the linear voltage divider is chosen so that the voltages at the linearly-determined null point for the two loop voltage conditions fall on each side of the voltage with respect to the point *b*, maintained by the Zener diode 34 at the other null point, the voltage across the null points, will reverse in polarity with a change in loop condition. The transistor 25 having its base terminal 27 and emitter terminal 26 connected to the opposite null points, reverses from the saturated to the back-biased "off" condition with the aforementioned changes. Thus the circuit makes especially efficient use of the bridge principle to obtain the advantages relating to precision thereof; and utilizes the additional nonlinear properties to provide unique output conditions for discrimination between loop signals of the same polarity varying only in degree. As pointed out supra and as may be better seen from the circuit of FIG. 1, neither a balanced nor a nonbalanced linear bridge provides unique output signals in response to varying externally applied voltages. Were a balanced bridge utilized, it would maintain no voltage difference between the base and emitter of a sensing transistor so that the transistor would reside at all times in an "almost-off" condition. A nonbalanced bridge, on the other hand, would maintain a voltage difference of but a single polarity at all times across the terminals of a transistor thus failing to provide unique output signals indicative of loop conditions.

A generator 38 is connected by a capacitor 39 to furnish interrogating signals at a predetermined frequency to the collector terminal 28 of the transistor 25. An output terminal 40 is connected by a capacitor 41 to the emitter terminal 26 and by a resistor 42 to ground.

The elements in the circuit of FIG. 1 may advantageously take the following illustrative values:

| | |
|---|---|
| Resistor **15** | 250 ohms. |
| Resistor **16** | do. |
| Resistor **18** | 850 ohms. |
| Resistor **19** | do. |
| Resistor **29** | 100K ohms. |
| Resistor **30** | 39K ohms. |
| Resistor **31** | 1 megohm. |
| Resistor **32** | 20K ohms. |
| Resistor **33** | 560K ohms. |
| Resistor **42** | 1.5K ohms. |
| Capacitor **17** | 2 $\mu$farads. |
| Capacitor **39** | .01 $\mu$farad. |
| Capacitor **41** | do. |
| Battery **20** | 27 volts. |
| Subset **11** (off-hook) | 500 ohms. |
| Transistor **25** | 2N414. |
| Breakdown level of Zener diode **34** | 4 volts. |

In a circuit including elements having the foregoing illustrative values, the voltage between the points *a* and *b* in the on-hook condition of the loop is approximately 27 volts and in the off-hook condition is approximately 10 volts. In the on-hook condition, the linear voltage divider action of the resistor 29 and 30 of the bridge maintains the emitter 26 approximately 20 volts less than point *a*. The voltage at the base terminal 27, on the other hand, is controlled by the Zener diode 34 to be approximately 4 volts higher than point *b* or 23 volts less than point *a*. With the collector terminal 28 connected to the point *b* by the high resistance 31, the transistor 25 is in saturation, and signal current from the generator 38 is advantageously transferred between the collector terminal 28 and the emitter terminal 26 without substantial diminution for utilization at the output tterminal 40.

On the other hand, in the off-hook condition of the loop, the voltage between the points *a* and *b* is approximately 10 volts. In this condition the base terminal 27 is maintained at a potential which is approximately 4 volts above point *b*, but which is only 6 volts below the point *a*. The emitter terminal 26 varies linearly to approximately 7 volts below point *a*. With the emitter terminal 26 of the PNP transistor 25 more negative than the base terminal 27, the transistor 25 is back-biased and "off," and no signal current from the generator 38 passes between the collector terminal 28 and the emitter terminal 26 so that no signal is available for utilization at the output terminal 40.

Since the transistor 25 operates in the "off" and saturated conditions while the loop is in the off-hook and on-hook conditions, respectively, an output signal at the terminal 40 from the generator 38 is indicative of the on-hook condition of the subset loop, while no output signal at the output terminal 40 is indicative of the off-hook condition. The presence or absence of signals may be utilized by the switching control circuitry, not shown but connected to the terminal 40, to determine the switching requirements of the remote line concentrator to which the subset loop is connected by the winding 21.

The biasing accomplished on the transistor 25 by the circuit of FIG. 1 is to be especially noted. In contradistinction to prior art supervisory circuits wherein an "off" state of the gating device is often unobtainable due to the difficulty of back-biasing thereof, the transistor 25 is back-biased and therefore substantially no leakage through the transistor 25 is possible. In addition, the various elements of the circuit of FIG. 1 may be chosen such that leakage paths other than the transistor 25 are substantially closed to interrogating signals. With the illustrative embodiment of the circuit set out in the above table, a ratio of desirable output signal to "off" state output signal of 400 to 1 was obtained whereas various prior art nonbridge circuits tested produced "discrimination ratios" varying between 10 to 1 and 20 to 1.

The outputs at the terminal 40, being substantially the absence and presence of signals, are most easily discriminated between even though the loop conditions measured are of the same polarity and relatively close together from a direct-current voltage or a current aspect.

It is to be noted that the circuit of FIG. 1 is adapted for use with switching control circuitry which requires for its operation output signals from the supervisory circuits in the on-hook condition and no signals therefrom in the off-hook condition. For use with such switching control circuitry the supervisory circuits must maintain an output and thus expend power a majority of the time. Since power at the remote concentrator is at a premium, as mentioned supra, the values of the elements of the bridge circuit of FIG. 1 are advantageously chosen to reduce power consumption to a minimum.

Additionally, the values of the various elements of the circuit of FIG. 1 are such as to place the transistor 25 in the saturated and "off" conditions by an amount sufficient that neither ringing nor voice currents, if they were in some manner to shunt around capacitor 17, would be capable of shifting the transistor 25 out of either of those conditions. Further, the low-valued resistors 18 and 19 form voltage dividers with the high-valued resistors of the bridge so that substantially no signals from the generator 38 reach the loop. If the generator 38 is producing signals of audio frequency or the scanning circuitry, not shown, attached to the output terminal 40, is operating at an audio rate, any minute audio signals reaching the loop are shunted to ground by the low-valued resistors 18 and 19 and the capacitor 17 which is of a value presenting substantially no impedance to signals of audio frequency.

Figure 2:
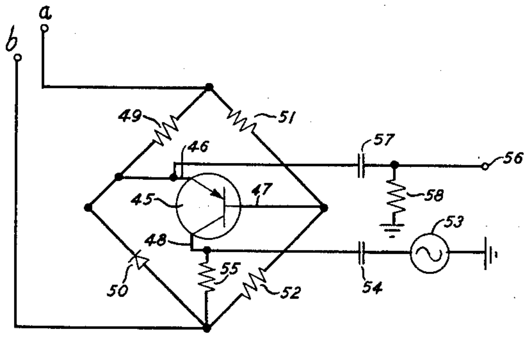
FIG. 2 is a schematic representation of a second illustrative embodiment of my invention for determining the direct-current condition of a subscriber subset loop employing a shunting path to eliminate undesirable leakage signals.

Referring now to the circuit of FIG. 2, there is shown a second supervisory bridge circuit for connection between the points *a* and *b* of the subset loop. A PNP transistor 45 having an emitter terminal 46, a base terminal 47, and a collector terminal 48 is utilized as a sensing element in the supervisory bridge. The transistor 45 has its emitter terminal 46 connected to a nonlinear voltage divider network connected between the points *a* and *b* which includes a resistor 49 as a first bridge arm and a Zener diode 50 as a second bridge arm. The base terminal 47 is connected to a linear voltage divider network connected between the points *a* and *b* including the resistor 51 and the resistor 52 representing the other two bridge arms. A signal generator 53 is connected by a capacitor 54 to the collector terminal 48 which is connected in turn to the point *b* by a resistor 55. An output terminal 56 is connected to the emitter terminal 46 by a capacitor 57 and to ground by a resistor 58.

As in the circuit of FIG. 1, the circuit of FIG. 2 provides a nonlinear bridge arrangement capable of being balanced at but a single external voltage level thereby furnishing both the high discriminating ability of the bridge-type circuitry and the means for completely reversing the bias on the sensing element in response to changes in the external voltage to furnish unique output signals. The circuit of FIG. 2 is additionally adapted to provide logical reversal of the output with respect to the output of the circuit of FIG. 1. This reversal may be desirable in telephone systems requiring output for operation of switching control circuitry during the off-hook condition of the loop. Further, the circuit of FIG. 2 advantageously utilizes the nonlinear arm 50 in a manner to facilitate the shunting from the output terminal 56 in the "off-state" of the transistor 45 of any undesirable leakage signals by providing a low impedance path to ground through that arm 50 in the high impedance state of the transistor 45.

The elements of the circuit of FIG. 2 may advantageously take the following illustrative values:

| | |
|---|---|
| Resistor **49** | 51K ohms. |
| Resistor **51** | 75K ohms. |
| Resistor **52** | 160K ohms. |
| Resistor **55** | 1 megohm. |
| Resistor **58** | 1.5K ohms. |
| Capacitor **54** | 0.002 $\mu$farads. |
| Capacitor **57** | Do. |
| Breakdown level of Zener diode **50** | 12 volts. |
| Transistor **45** | 2N414. |

In the on-hook condition of the subset loop, when the voltage between the points *a* and *b* is substantially 27 volts, the base terminal 47 is maintained at approximately 9 volts less than point *a* by the linear voltage divider comprising the resistors 51 and 52, while the Zener diode bridge arm 50 maintains the emitter terminal 46 approximately 12 volts above the point *b* and thus 15 volts below the point *a*. Since the emitter terminal 46 of the PNP transistor 45 is more negative than the base terminal 47 thereof, the transistor 45 is back-biased and "off," and no signal from the generator 53 reaches the output terminal 56. The Zener diode 50, however, is capable of conducting in the reverse direction and shunts all currents from the output terminal 56 to ground through the resistor 19.

On the other hand, in the off-hook state, with the voltage between points *a* and *b* at 10 volts, the base terminal 47 is controlled by the linear voltage divider to be approximately 3 volts less than the point *a*, while the Zener diode 50, having a 12-volt breakdown level, is back-biased for nonconduction and allows no current to flow therethrough. Thus the emitter terminal 46 is positive with respect to the base terminal 47, and the transistor 45 saturates and allows current from the generator 53 to pass to the output terminal 56 for utilization thereat.

As mentioned supra, it is to be noted that the diode 50 in the circuit of FIG. 2 provides a low impedance shunt path in parallel with the output terminal 56 so that leakage through the transistor 45 is eliminated in the "off" state thereof. In the "on" state of the transistor 45 this path is substantially open due to the back-biasing of the diode 50. The shunted signal does not interfere with the loop audio signals because of the further shunting action of the capacitor 17 and the resistors 18 and 19.

Figure 3:
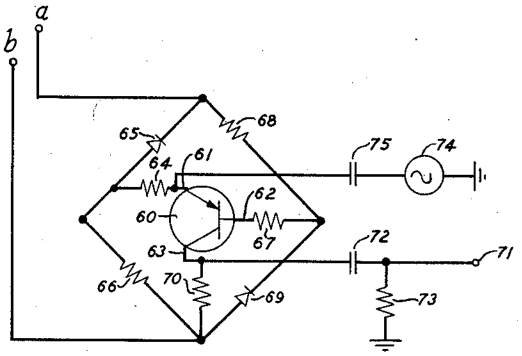
FIG. 3 is a schematic representation of a third illustrative embodiment of my invention employing dual Zener diode means for more precise output discrimination.

Referring now to the circuit of FIG. 3, there is shown a third embodiment of my invention for supervising the direct-current condition of a subscriber subset loop. The bridge sensing element of this circuit comprises a transistor 60 having an emitter terminal 61, a base terminal 62, and a collector terminal 63. The emitter terminal 61 is connected by a resistor 64 to two arms of a bridge circuit which form a nonlinear voltage divider network connected between the points *a* and *b*. This voltage divider network comprises a Zener diode 65 and a resistor 66. The base terminal 62 is connected by a resistor 67 to two other arms of the bridge which form a second nonlinear voltage divider network connected between points *a* and *b*. This second voltage divider network comprises a resistor 68 and a Zener diode 69. The collector terminal 63 is connected to the point *b* by a resistor 70 and to an output terminal 71 by a capacitor 72. The output terminal 71 is grounded by a resistor 73. A generator 74 furnishes interrogation signals to the emitter terminal 61 through a coupling capacitor 75.

The circuit of FIG. 3 also accomplishes precise measurement of subset loop voltages by a nonlinear bridge, in this circuit a bridge having two nonlinear arms. In this bridge the Zener diodes 65 and 69 maintain the null voltages constant with respect to opposite ones of the external terminals. With both null terminals thus maintained, a change in loop voltage causes a faster reversal of polarity for biasing the sensing element than in the circuits of FIGS. 1 and 2 wherein only one null terminal is positively controlled and the other is allowed to vary linearly. Again, as in the other circuits of this invention, back-biasing allows a more complete turn-off of a sensing element than prior art circuits.

The elements of the circuit of FIG. 3 may advantageously take the following illustrative values:

| | |
|---|---|
| Resistor 64 | 5.1K ohms. |
| Resistor 66 | 160K ohms. |
| Resistor 67 | 100K ohms. |
| Resistor 68 | 150K ohms. |
| Resistor 70 | 270K ohms. |
| Resistor 73 | 2.7K ohms. |
| Capacitor 72 | 0.005 μfarads. |
| Capacitor 75 | Do. |
| Breakdown level of Zener diode 65 | 8 volts. |
| Breakdown level of Zener diode 69 | 6 volts. |
| Transistor 60 | 2N414. |

In such an illustrative circuit, the emitter terminal 61 is controlled by the voltage divider network connected thereto and specifically by the Zener diode 65 to remain at all times substantially 8 volts below the point *a* while the base terminal 62 is controlled to remain at all times 6 volts above the point *b*. In this manner, when the subset 11 is on-hook and the voltage between the points *a* and *b* is substantially 27 volts, the emitter terminal 61 is positive with respect to the base terminal 62; and the transistor 60 is saturated. On the other hand, in the off-hook state when the voltage between the points *a* and *b* is approximately 10 volts, the emitter terminal 61 is negative with respect to the base terminal 62; and the transistor 60 is back-biased and "off." Thus signals from the generator 74 cannot reach the output terminal 71 during the off-hook condition of the subset 11, while signals from the generator 74 reach the output terminal 71 during the on-hook condition of the subset loop providing the desired unique outputs indicative of the loop conditions.

It is to be understood that the above-described arrangements are illustrative of the applications and the principles of this invention. Numerous other arrangements may be devised by those skilled in the art without departing from the spirit and scope of the invention.

What is claimed is:

1. A supervisory circuit for a telephone system comprising a subset loop having either one of two predetermined currents flowing therein at all times, signal generating means, output means, gating means joining said generating means and said output means, and nonlinear bridge means connected to said loop and said gating means for operating said gating means in response to only a selected one of said two predetermined currents flowing in said loop.

2. A supervisory circuit as in claim 1 wherein said bridge means comprises four arms serially connected in a square format, said bridge means being connected to said loop at a first pair of diagonally-opposed connecting points between said arms and being connected to said gating means at the other pair of diagonally-opposed connecting points.

3. A supervisory circuit as in claim 2 wherein at least one of said arms includes a Zener diode.

4. A supervisory circuit as in claim 2 wherein two of said arms include Zener diodes.

5. A supervisory circuit as in claim 3 wherein said gating means includes a transistor having an emitter terminal and a base terminal each connected to one of said other pair of diagonally-opposed connecting points, and a collector terminal additionally connected to one of said first pair of diagonally-opposed connecting points, and wherein said bridge means controls the operation of said transistor in either the reverse-bias or saturated condition.

6. A supervisory circuit as in claim 5 wherein said generating means and said output means are connected to said collector terminal and said emitter terminal.

7. A supervisory circuit for determining the condition of a subset loop comprising a transistor having an emitter, a base, and a collector; signal generating means coupled to said collector; output means coupled to said emitter; and a bridge circuit for controlling said transistor to gate signals from said generating means to said output means in response to the direct-current condition of the subset loop, said bridge circuit having first, second, third, and fourth impedance arms serially connected in a square, said first and second arms being connected to one side of the loop, said third and fourth arms and said collector of said transistor being connected to the other side of the loop, said first and third arms being connected to said base of said transistor, said second and fourth arms being connected to said emitter of said transistor, and wherein said third arm includes a Zener diode having a breakdown voltage of predetermined value for either back-biasing or saturating said transistor in accordance with the condition of said loop.

8. A supervisory circuit for determining the condition of a subset loop comprising a transistor having an emitter, a base, and a collector; signal generating means coupled to said collector; output means coupled to said emitter; and a bridge circuit for controlling said transistor to gate signals from said generating means to said output means in response to the direct-current condition of the subset loop, said bridge circuit having first, second, third and fourth impedance arms serially connected in a square, said first and second arms being connected to one side of the loop, said third and fourth arms and said collector of said transistor being connected to the other side of the loop, said first and third arms being connected to said base of said transistor, said second and fourth arms being connected to said emitter of said transistor, and wherein said fourth arm includes a Zener diode having a breakdown voltage of predetermined value for either back-biasing or saturating said transistor in accordance with the condition of said loop.

9. A circuit for determining the condition of a subscriber subset in a telephone system comprising in combination a subset loop including a subset and energizing means therefor; a transistor having at least three terminals; signal generating means connected to one of said terminals; output means connected to another of said terminals; and a measuring bridge connected across said loop and to said terminals of said transistor, said bridge including means for biasing said transistor to operate in a saturated state in response to a first direct-current condition of said loop and for back-biasing said transistor in response to a second direct-current condition of said loop.

10. A circuit as in claim 9 wherein said last-mentioned means includes means for reversing the direction of current between two of said terminals of said transistor connected to said bridge in response to a change in the direct-current condition in said loop.

11. A supervisory circuit for determining the condition of a subset in a telephone system comprising in combination a subset loop including a subscriber subset and means for energizing said subset connected thereto; a transistor including a first and a second control terminal; and a bridge circuit including four bridge arms and connection points therebetween, said bridge circuit being connected across said loop at a first pair of diagonally-opposed ones of said connection points and to said first and second control terminals at a second pair of diagonally-opposed ones of said connection points, and wherein said bridge circuit includes means for balancing said bridge in response only to a single voltage applied between said first pair of connection points.

References Cited in the file of this patent

UNITED STATES PATENTS

| | | |
|---|---|---|
| 2,715,656 | Andrews | Aug. 16, 1955 |
| 2,715,657 | Andrews | Aug. 16, 1955 |
| 2,859,402 | Schaeve | Nov. 4, 1958 |
| 2,864,053 | Woodworth | Dec. 9, 1958 |
| 2,882,450 | McCabe | Apr. 14, 1959 |
| 2,901,740 | Cutsogeorge | Aug. 25, 1959 |
| 2,961,553 | Giger | Nov. 22, 1960 |
| 2,962,555 | Abbott | Nov. 29, 1960 |